(12) United States Patent
Kanso et al.

(10) Patent No.: US 8,695,012 B2
(45) Date of Patent: Apr. 8, 2014

(54) LOAD AND BACKUP ASSIGNMENT BALANCING IN HIGH AVAILABILITY SYSTEMS

(75) Inventors: Ali Kanso, Montreal (CA); Maria Toeroe, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 276 days.

(21) Appl. No.: 13/020,550

(22) Filed: Feb. 3, 2011

(65) Prior Publication Data

US 2011/0197198 A1 Aug. 11, 2011

Related U.S. Application Data

(60) Provisional application No. 61/301,717, filed on Feb. 5, 2010.

(51) Int. Cl.
*G06F 9/46* (2006.01)

(52) U.S. Cl.
USPC .............................................. 718/105; 714/4

(58) Field of Classification Search
None
See application file for complete search history.

(56) References Cited

U.S. PATENT DOCUMENTS

| | | | |
|---|---|---|---|
| 2002/0007468 A1* | 1/2002 | Kampe et al. ..................... | 714/4 |
| 2005/0204183 A1* | 9/2005 | Saika ................................. | 714/4 |
| 2008/0244552 A1* | 10/2008 | Toeroe ........................... | 717/168 |
| 2009/0164832 A1 | 6/2009 | Kanso et al. | |

FOREIGN PATENT DOCUMENTS

| | | |
|---|---|---|
| WO | 01/84312 A2 | 11/2001 |
| WO | 02/15526 A1 | 2/2002 |
| WO | 03/102772 A2 | 12/2003 |

OTHER PUBLICATIONS

Service Availability Forum, Service Availability Forum Application Interface Specification, Availability Management Framework, SAI-AIS-AMF-B.04.01, Oct. 21, 2008.*
Jong Kim et al., Process Allocation for Load Distribution in Fault-Tolerant Multicomputers, 25th International Symposium on Fault Tolerant Computing Digest of Papers, Pasadena, Jun. 27-30, 1995, Los Alamitos, IEEE Comp. Soc. Press, US, vol. SYMP 25, Jun. 27, 1995, pp. 174-183.
Service Availability Forum, Service Availability Forum Application Interface Specification, Availability Management Framework, SAI-AIS-AMF-B.04.01, Oct. 21, 2008, pp. 1-13, 33-95, 230-244.
PCT Search Report from corresponding application PCT/IB2011/050501.
Kanso, A., Khendek, F., Toeroe, M. and Hamou-Lhadj, A. (2013), Automatic configuration generation for service high availability with load balancing. *Concurrency Computat.: Pract. Exper.*, 25: 265-287. doi: 10.1002/cpe.2805.

(Continued)

*Primary Examiner* — Emerson Puente
*Assistant Examiner* — Mehran Kamran
(74) *Attorney, Agent, or Firm* — Blakely, Sokoloff, Taylor & Zafman

(57) ABSTRACT

Among other things, embodiments described herein enable systems, e.g., Availability Management Forum (AMF) systems, having service units to operate with balanced loads both before and after the failure of one of the service units. A configuration can be generated which provides for distributed backup roles and balanced active loads. When a failure of a service unit occurs, the active loads previously handled by that service unit are substantially evenly picked up as active loads by remaining service units.

20 Claims, 11 Drawing Sheets

(56) References Cited

OTHER PUBLICATIONS

Kanso, et al., Ranking Service Units for Providing and Protecting Highly Available Services with Load Balancing in the *Proceedings of the 10th annual international conference on New Technologies of Distributed Systems* (*NOTERE*). IEEE computer society (Tunisia chapter).

* cited by examiner

500

| | SU1 | SU2 | SU3 | SU4 | SU5 | SU6 |
|---|---|---|---|---|---|---|
| SI1 | 1 | 2 | 3 | 4 | 5 | 6 |
| SI2 | 4 | 5 | 6 | 1 | 2 | 3 |
| SI3 | 1 | 2 | 3 | 4 | 5 | 6 |
| SI4 | 4 | 5 | 6 | 1 | 2 | 3 |
| SI5 | 1 | 2 | 3 | 4 | 5 | 6 |
| SI6 | 4 | 5 | 6 | 1 | 2 | 3 |
| SI7 | 1 | 2 | 3 | 4 | 5 | 6 |
| SI8 | 4 | 5 | 6 | 1 | 2 | 3 |
| SI9 | 1 | 2 | 3 | 4 | 5 | 6 |
| SI10 | 4 | 5 | 6 | 1 | 2 | 3 |
| SI11 | 1 | 2 | 3 | 4 | 5 | 6 |
| SI12 | 4 | 5 | 6 | 1 | 2 | 3 |
| SI13 | 1 | 2 | 3 | 4 | 5 | 6 |
| SI14 | 4 | 5 | 6 | 1 | 2 | 3 |

*Fig. 5*

LOAD AND BACKUP ASSIGNMENT BALANCING IN HIGH AVAILABILITY SYSTEMS

RELATED APPLICATION

This application is related to, and claims the benefit of priority from, U.S. Provisional Patent Application Ser. No. 61/301,717, filed on Feb. 5, 2010, the disclosure of which is expressly incorporated by reference herein.

TECHNICAL FIELD

The present invention generally relates to high availability systems (hardware and software) and, more particularly, to managing workload assignments and backup assignments associated with such high availability (or other) systems.

BACKGROUND

High availability systems (also known as HA systems) are systems that are implemented primarily for the purpose of improving the availability of services which the systems provide. Availability can be expressed as a percentage of time during which a system or service is "up". For example, a system designed for 99.999% availability (so called "five nines" availability) refers to a system or service which has a downtime of only about 0.44 minutes/month or 5.26 minutes/year.

High availability systems provide for a designed level of availability by employing redundant nodes, which are used to provide service when system components fail. For example, if a server running a particular application crashes, an HA system will detect the crash and restart the application on another, redundant node. Various redundancy models can be used in HA systems. As HA systems become more commonplace for the support of important services such file sharing, internet customer portals, databases and the like, it has become desirable to provide standardized models and methodologies for the design of such systems. The reader interested in more information relating to the AIS standard specification is referred to Application Interface Specifications (AIS), Release 6.1, which is available at www.saforum.org, the disclosure of which is incorporated here by reference.

Of particular interest for the present application is the Availability Management Framework (AMF), which is a software entity or service defined within the AIS specification. According to the AIS specification, the AMF is a standardized mechanism for providing service availability by coordinating redundant resources within a cluster to deliver a system with no single point of failure.

The AMF service requires a configuration for any application it manages. An AMF configuration can be seen as an organization of some logical entities. It also comprises information that can guide AMF in assigning the workload to the application components. AMF managed applications are typically deployed as distributed system over a cluster of nodes, and load balancing is therefore an important aspect to be considered when designing the configuration.

Designing an AMF configuration requires a good understanding of AMF entities, their relations, and their grouping. This grouping is guided by the characteristics of the software that will be deployed in an AMF managed cluster. These characteristics are described by the software vendor in terms of prototypes delivered in an Entity Types File (ETF).

More specifically, the design of an AMF configuration consists of selecting a set of AMF entity types from a set of ETF prototypes, specifying the entities and their attributes in order to provide and protect the services as required by the configuration designer. Creating manually such a configuration can be a tedious and error prone task due to the large number of required types, entities and attributes. This is combined with the complexity of selecting the appropriate ETF prototypes and deriving from them the necessary AMF types to be used in the configuration. During the type selection and derivation, several constraints need to be satisfied. Some of these constraints require calculations and extensive consistency checks. Moreover, the configuration ideally needs to be designed in such a way that load balancing is preserved even in case of failure.

In terms of the AMF entities, in an AMF configuration a component represents a set of hardware and/or software resources that implements the APIs that allow AMF to control its life cycle and its workload assignment. The components that combine their functionalities to provide a more integrated service are logically grouped into a service unit (SU). For control purposes, the workload assigned to a component is abstracted as a component service instance (CSI). CSIs are grouped into a service instance (SI), which represent an abstraction of workload assigned to the SU. In order to ensure the provision of the SI in case of an SU failure, SUs are grouped into a service group (SG). The SGs are grouped into an application. An SU can be assigned the active HA (High Availability) state for an SI, the standby HA state, or it can be a spare one. The SI is provided by the SU(s) assigned the HA active state. The SIs provisioning is protected by the SG according to a redundancy model. AMF will dynamically shift the assignment of the SI from a failed SU to another SU in the same SG. There are two additional AMF logical entities used for deployment purpose: the cluster and the node. The cluster consists of a collection of nodes under the control of AMF.

An example of an AMF configuration 100 is shown in FIG. 1 where the components C1 and C2 are grouped into SU1, which collaborates with other similar SUs of the SG to protect the provision of the SIs, i.e., SU2 and SU3. An AMF application 102 is a grouping of SGs and the SIs that they protect. In this example, one SG is using the NWayActive redundancy model to protect three SIs, SI1, SI2 and SI3. The CSIs of the SIs represent the workload assigned to the components. Each SI has two active assignments, represented by the arrows pointing from each SI toward different SUs. Each active assignment is assigned to a different SU by assigning the associated CSIs to each of the two components of the SU. Since each SI has two active SUs, the SI is immune to any component, SU or node failure, as the other SU can carry on the provision of the service abstracted by the SI.

As mentioned above, the assignment of SIs to SUs is performed at runtime. For the NWayActive redundancy model, this assignment, and the re-assignment after an SU failure, is performed for each SI according to its ranked list of SUs. The ranking is established at configuration time and reflects the preference in the assignment distribution. For example, this preference may be related to distribution of data in a distributed database. Using conventional algorithms to determine the ranked list, like round robin, the shifting of SIs from a failed SU to healthy ones may lead to an unbalanced workload among the SUs, which may lead to overload causing subsequent failures and performance degradation.

Accordingly, it would be desirable to provide methods, devices, systems and software for load and backup assignment management in, for example, high availability systems.

SUMMARY

Among other things, embodiments described herein enable systems having service units to operate with balanced loads both before and after the failure of one of the service units. A configuration can be generated which provides for distributed backup roles and balanced active loads. When a failure of a service unit occurs, the active loads previously handled by that service unit are substantially evenly picked up as active loads by remaining service units.

According to one exemplary embodiment, a method for balancing backup assignments and active workload assignments for a group of service units in a system includes the steps of distributing the backup assignments for each service unit substantially equally among other service units in the group, and balancing the active workload assignments among the service units in the group.

According to another exemplary embodiment, a configuration generator includes a processor configured to distribute backup assignments for each service unit in a group substantially equally among other service units in the group, to balance active workload assignments among the service units in the group, and to generate a configuration which takes into account the distributed backup assignments and the balanced active assignments.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 5 shows a ranked list of service units using a conventional round robin algorithm;

DETAILED DESCRIPTION

Figure 1:
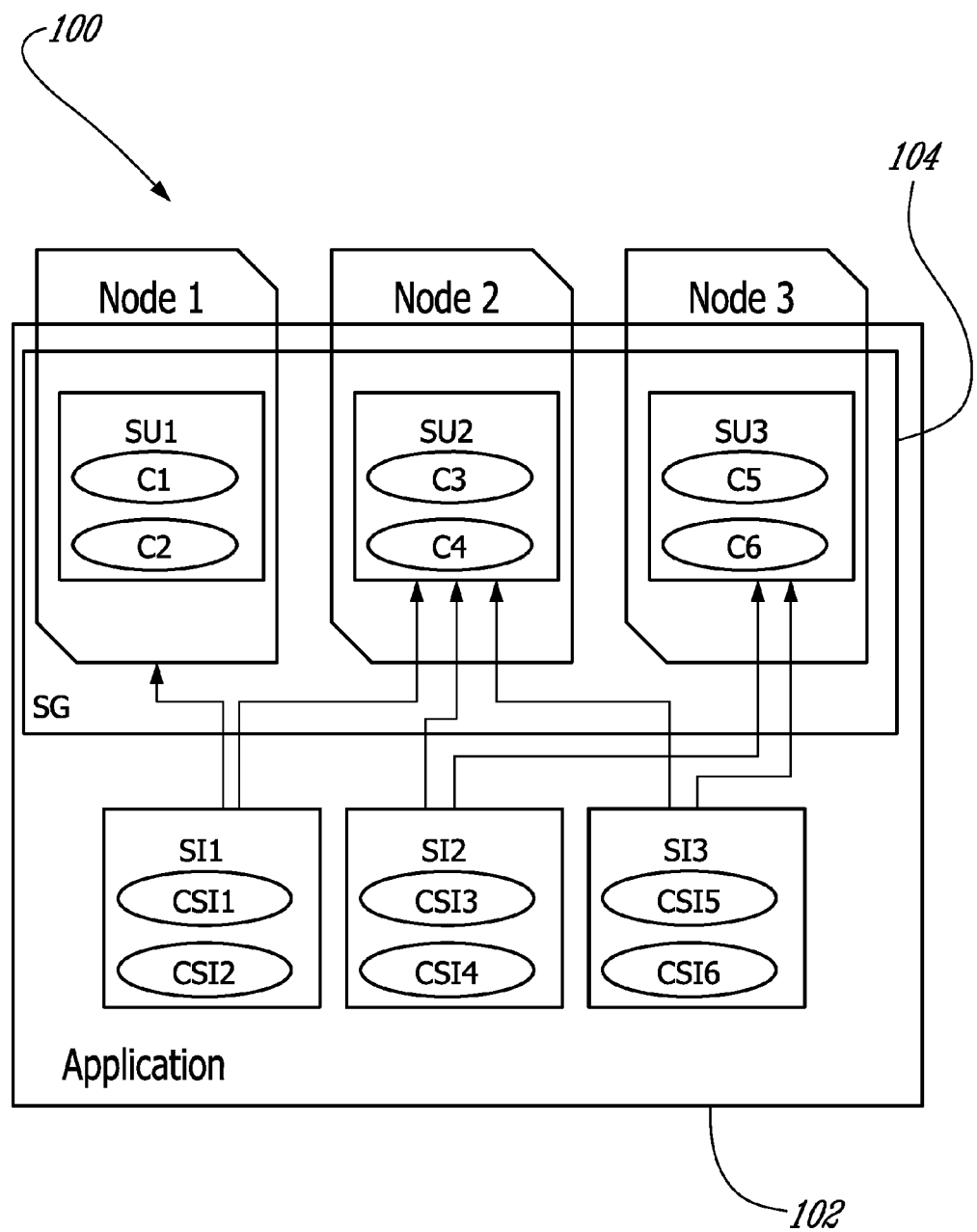
FIG. 1 illustrates an exemplary AMF configuration.

The following description of the exemplary embodiments of the present invention refers to the accompanying drawings. The same reference numbers in different drawings identify the same or similar elements. The following detailed description does not limit the invention. Instead, the scope of the invention is defined by the appended claims.

According to an embodiment, to ensure a continuous load balancing of service units in a system both prior to any service unit failure and in the presence of a failure, embodiments described herein views the workload assignment task as a Constraints Solving Problem (CSP) to generate various algorithms which can be used to perform workload assignments. Such algorithms can, at least in part, be based upon the type of redundancy model used in a system.

In order to provide some context for methods and systems for balancing backup assignments and active workload assignments according to embodiments, a detailed discussion of AMF configuration generation will first be provided, since such embodiments can be implemented as part of an AMF configuration generation process. The detailed discussion associated with balancing backup assignments and active workload assignments begins at the heading "Service Unit Ranking for Service Instances Amidst Load Balancing Concerns" below. Moreover, the presence of the following, detailed discussion of AMF configuration generated is intended to be purely illustrative rather than limiting, e.g., embodiments can be implemented in non-AMF systems.

As mentioned briefly above, an SG redundancy model defines how the SUs of the SG will protect the SIs of the SG. There are five different redundancy models: 2N, N+M, NWay, NWayActive, and No-Redundancy currently being used in conjunction with AMF systems. These redundancy models differ with respect to the distribution of the active and standby state assignments for the SI among the SUs, and define how many active and standby state assignments an SI may have. For example, the 2N redundancy model specifies that each SI protected by an SG can have one active and one standby HA state assignment and in the SG at most one SU will have the active HA state for all SIs of the SG and is referred to as the active SU, and at most one SU will have the standby HA state and is called the standby SU. In an AMF system using 2N redundancy there is one active SU at all time and, therefore, no load balancing is needed. The same is true for the standby SU.

An SG with the N+M redundancy model is similar to 2N, each SI has one active and one standby HA state assignments, but the SG has N active SUs and M standby SUs. An SU can be active for all SIs assigned to it or standby for all SIs assigned to it. That is to say, no SU can be simultaneously active for some SIs and standby for some other SIs. The AMF specification does not require a ranked list of SUs for the SIs in this case. Load balancing may be needed for systems employing an N+M redundancy model, however the AMF specification also does specify any load balancing mechanism for this model.

The No-Redundancy redundancy model is typically used with non-critical components, when the failure of a component does not cause any severe impact on the overall system. In SGs using the No-Redundancy model, there are no standby SUs, but there can be spare SUs. An SI can be assigned to only one SU at a time. An SU is assigned the active HA state for at most one SI. Therefore, load balancing is also not an issue for this redundancy model.

An SG with the NWay redundancy model contains N SUs that protect multiple SIs. An SU can simultaneously be assigned the active HA state for some SIs and the standby HA state for some other SIs. At most, one SU may have the active HA state for an SI, but one, or multiple SUs may have the standby HA state for the same SI.

An SG with the NWayActive redundancy model (also sometimes referred to as active-active or load-sharing) contains N SUs. An SU has to be active for all SIs assigned to it. An SU is never assigned the standby HA state for any SI. From the service side, for each SI, one, or multiple SUs can be assigned the active HA state according to the preferred number of assignments, numberOfActiveAssignments, configured for the SI. The numberOfActiveAssignments is always less or equal to the number of SUs in the SG.

Thus the embodiments described below focus on the NWayActive redundancy model as the assignment of SIs to SUs is governed by the SUs ranking for the SIs as illustrated hereafter. This should not, however, be construed as limiting to the scope of the present invention, as various aspects of these embodiments may be applicable to other redundancy models. Prior to discussing such embodiments, some additional information about AMF configurations and entity types will be provided for context.

All AMF entities, except the cluster and nodes, are typed. The entity types provide AMF with the information about the shared characteristics of their entities. For example, the component type determines the component service types any component of this type shall provide. AMF uses this information to determine to which component within an SU to assign a particular CSI. Therefore, when building an AMF configuration, the AMF types need to be determined before creating the AMF entities of these types. Table 1 below lists the AMF configuration entities and their corresponding types.

which an SU of the type can be built. It may limit the maximum number of components of a particular type that can be included. Thus, the SU type defines any limitation on the collaboration and coexistence of component types within its SUs.

Service Type:
A service type defines the set of component service types from which its SIs can be built. The service type may limit the number of CSIs of a particular CS type that can exist in a service instance of the service type. It is also used to describe the type of services supported by an SU type.

Service Group Type (SG type):
The service group type defines for its SGs the redundancy model. It also specifies the different SU types permitted for its SGs. Thus the SG type plays a key role in determining the availability of services.

Application Type:
The application type defines the set of SG types that may be used to build applications of this type.

It should be noted that the only mandatory types in an ETF are the component type and the component service type. Further types (i.e., SU types, SG types, service types and application types) may be used by the vendor to specify software implementation constraints and limitations to be considered at the integration of this software with an AMF implementation, but they are not mandatory. If no optional

TABLE 1

The AMF configuration elements.

| Entity | Acronym | Brief description | Corresponding type |
|---|---|---|---|
| Component | — | A set of hardware and/or software resources | Component type |
| Service Unit | SU | A set of collaborating components | SU type |
| Service Group | SG | A set of SUs protecting a set of SIs | SG type |
| Application | — | A set of SGs and the SIs they protect | Application type |
| Service Instance | SI | The workload assigned to the SU | Service type |
| Component service Instance | CSI | The workload assigned to the component | CS type |
| Node | — | A cluster node | — |
| Cluster | — | The cluster hosting AMF and the applications | — |

AMF types are derived from prototypes defined in the Entity Types File (ETF), which is an XML file provided by the software vendor and that describes the application software developed to be managed by an AMF implementation. ETF prototypes, their relations, and main characteristics can be summarized as follows.

Component Type:
A component type describes a particular version of a software implementation designed to be managed by AMF. The component type specifies the component service types that the components of this type can provide. It defines for each component service type the component capability model and any required dependency on other component service types. The component capability model is defined as triplet $(x, y, b)$, where x represents the maximum number of active CSI assignments, y the maximum number of standby CSI assignments a component can handle for a particular component service type and b indicates whether active and standby assignments can be handled simultaneously.

Component Service Type (CS type):
It describes the set of attributes that characterizes the workload that can be assigned to a component of a particular type in conjunction of providing some service.

Service Unit Type (SU type):
The service unit type specifies the service types an SU of the type can provide, and the set of component types from type is provided at a particular level (e.g. there is no SU type), then types of the level below (i.e. the component types) can be combined as needed without any restriction. If any optional type is provided at a particular level, it is assumed that all allowed types at that level are specified by the vendor.

Figure 2:
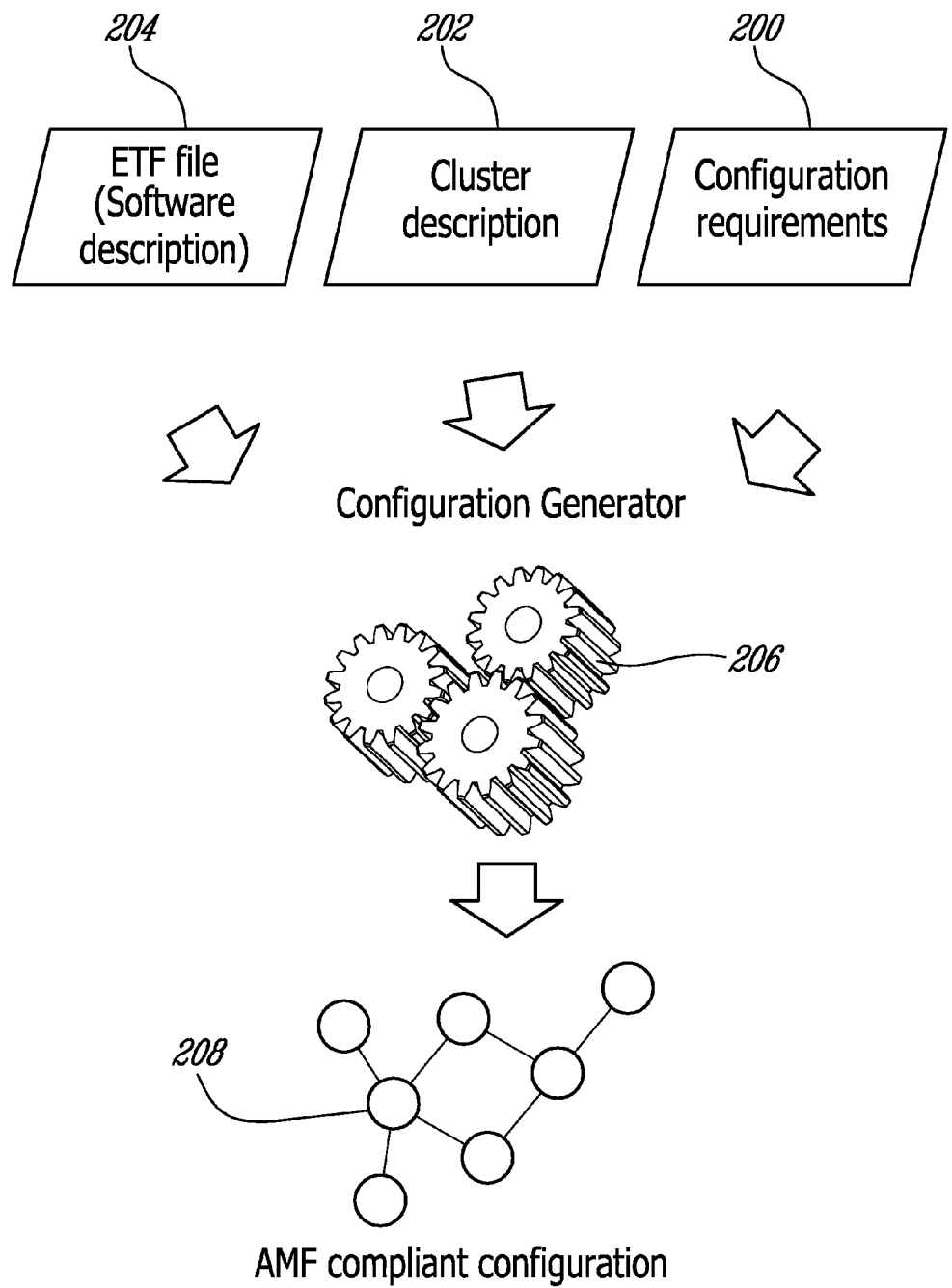
FIG. 2 depicts operation of an AMF configuration generator.

To generate an AMF configuration, an AMF configuration generator or method can take inputs from, for example, two sources: the configuration designer and the software vendor as is conceptually illustrated in FIG. 2. Therein, the configuration designer defines the services to be provided in terms of SIs and CSIs together with their desired protection, i.e., the redundancy model. This aspect is represented in FIG. 2 by the configuration requirements 200. The configuration designer also provides the information about the deployment cluster and its nodes, e.g., the number of nodes. The AMF cluster entity and the node entities, referred to in FIG. 2 as the cluster description 202, can be added to the configuration without any further processing. The software to be used to provide the required services is characterized by each vendor in an ETF file 204 as described above.

To facilitate the specification of the required services and the cluster, templates can be defined by the configuration generator 206. For example, an SI-template represents the SIs that share common features including the service type, the desired redundancy model: (e.g., 2N, N+M, etc.), the number of active and standby assignments, and the associated CSI-templates. A CSI-template defines the CS type with its number of CSIs. The same concept applies for a node-template. Once the services, cluster description and the software are specified, the configuration generation method proceeds with selecting the appropriate ETF types for each required service.

Figure 3:
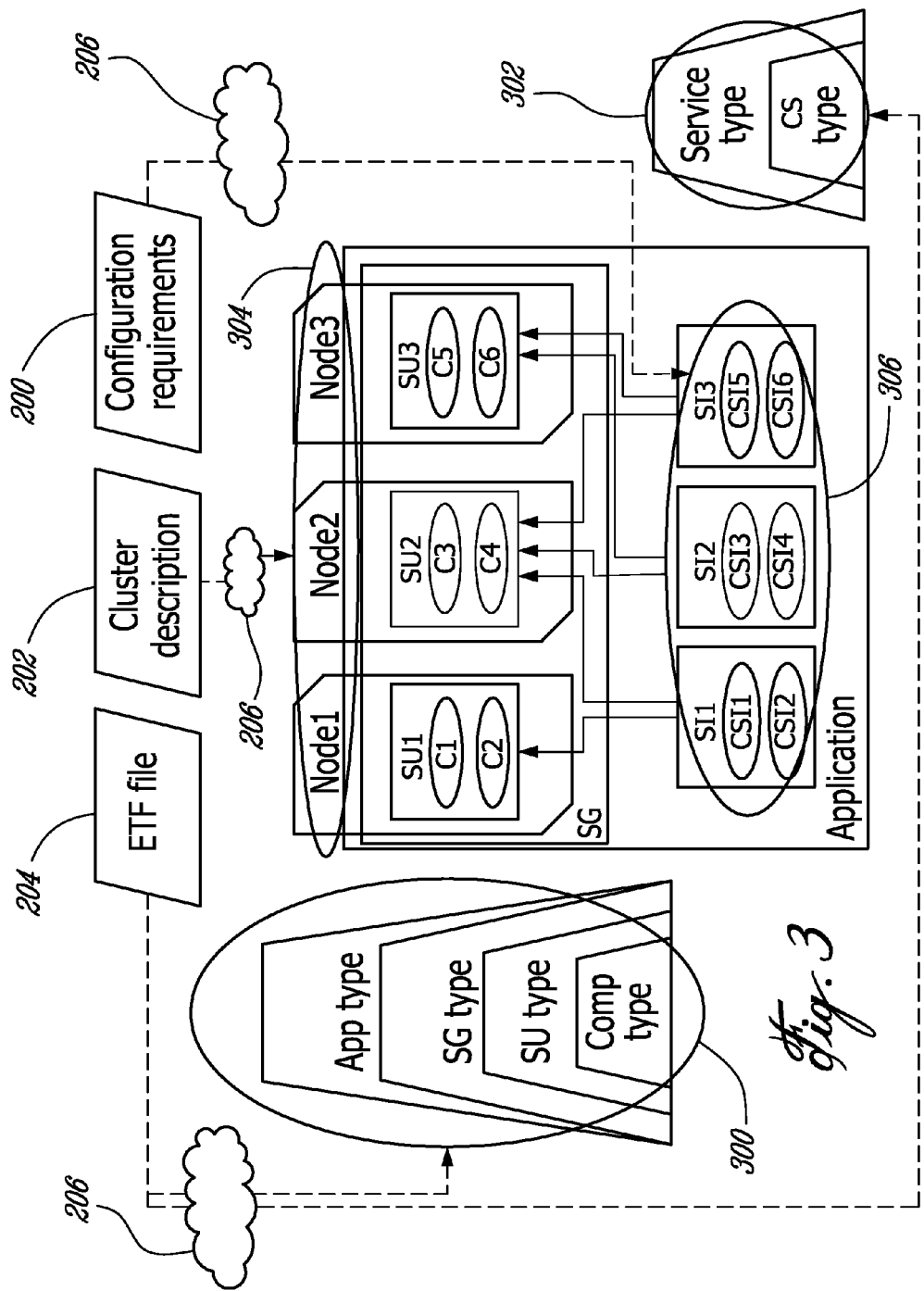
FIG. 3 shows conceptually how the AMF configuration generator of FIG. 2 generates the AMF configuration of FIG. 1.

FIG. 3 illustrates at a conceptual level how each portion of the inputs 200, 202 and 204 are used by the configuration generator 206 to generate an AMF configuration 208, e.g., the configuration 100 shown in FIG. 1. The ETF content 204 will be processed by the configuration generator 206 in order to find the proper types 300, 302 that will be used to derive or build the AMF types. The cluster description is going to be directly used to create the nodes 304. Finally, the information in the SI and CSI template created from the configuration requirements 200 will be processed to be used for two main purposes (1) to create the SIs and CSIs 306 and (2) to select the appropriate ETF types that can support these services. The words "services" and "workload" are used interchangeably herein and, in the context of configuration generation, these terms have the same meaning, which is that the SIs and CSIs that are eventually going to be assigned by AMF to components and SUs. The configuration generator 206 will create the rest of the AMF entities based on the calculations performed on the information that is extracted from the inputs 200, 202 and 204 as described below.

The SI template specifies the required redundancy model, and the number of SUs that will protect the SIs of this template. For instance if the specified redundancy model is 2N, then the SG protecting the SIs will only have one active SU and one standby, and thus any SU of this SG must be capable of supporting all the SIs in their active or standby HA state. The capacity of the SU in supporting the SIs is determined by two factors: the capacity of its components in supporting the CSIs of the SIs, and the number of components that can be grouped in this SU. The component capacity in supporting the CSIs is specified in the component type's capability model defined for the CS type of the CSIs. The maximum number of components of a particular type that can be grouped within an SU is specified by the SU type of the SU. In other words, the types hold all the required information about the capacities of the SUs and their components. Therefore, a significant criterion in selecting any type is the expected load of SIs or CSIs an entity of this type is expected to handle within the SG.

The load of SIs which each SU needs to handle depends on the total number of SIs that the SG has to protect, the protection it needs to provide for each SI, i.e., the number of active and standby assignments, and the number of SUs among which these assignments are distributed. More precisely, for each SI-template, the minimum expected load of an SU for the active and standby assignments is determined as defined by the redundancy model using Equations 1 and 2 below, respectively.

The load of active SI assignments for an SU.

$$ActiveLoadOfSIs = \begin{cases} ceil\left(\frac{numberOfSIs}{numberOfSUs}\right) & \text{if } redMod = \text{"N Way"} \\ ceil\left(\frac{numberOfSIs \times numberOfActiveAssignment}{numberOfActiveSUs}\right) & \text{if } redMod = \text{"N Way Active"} \\ 1 & \text{if } redMod = \text{"No Redundancy"} \\ numberOfSIs & \text{if } redMod = \text{"2N"} \\ ceil\left(\frac{numberOfSIs}{numberOfActiveSUs}\right) & \text{if } redMod = \text{"N Way"} \end{cases}$$

Equation 1

The load of standby SI assignments for an SU.

$$StandbyLoadOfSIs = \begin{cases} ceil\left(\frac{numberOfSIs \times numberOfStdbAssignment}{numberOfSUs}\right) & \text{if } redMod = \text{"N Way"} \\ 0 & \text{if } redMod = \text{"N Way Active"} \\ 0 & \text{if } redMod = \text{"No Redundancy"} \\ numSIs & \text{if } redMod = \text{"2 N"} \\ ceil\left(\frac{numberOfSIs}{numberOfStdbSUs}\right) & \text{if } redMod = \text{"N + M"} \end{cases}$$

Equation 2 where:
numberOfSUs refers to the total number of SUs of the SG that will protect the SIs of the template,
numberOfSIs refers to the number of SIs specified in the SI template,
numberOfActiveSUs refers to the number of SUs that have active assignments only,
numberOfStdbSUs specifies the number of SUs that have standby assignments only,
numberOfActiveAssignments refers to the number of active assignments for each SI,
numberOfStdbAssignments refers to the number of standby assignments for each SI, and
redMod is used for the redundancy model specified in the SI template.

The above equations use the characteristics of the various redundancy models to determine the load in terms of the number of SI assignments an SU is expected to handle. For example, for the NWay redundancy model, the load of active SI assignments for an SU is calculated as the total number of SIs of an SG of the SI-template divided by the number of SUs since an SI is assigned active to at most one SU and all SUs may handle active assignments. To guarantee that there is always an SU, which can take over the active load of a failed SU, the configuration generator 206 may use numberOfSUs−1 as the number of SUs. For the same redundancy model, the number of SIs an SU can handle in a standby state (in Equation 2) is the number of standby assignments of the SIs divided by the number of SUs. The number of standby assignments of all SIs is calculated as numOfSIs×numberOfStdbAssignments since, in an NWay redundancy model, an SI can have multiple standby assignments. The same principle can be applied to other redundancy models to compute the load of SIs assigned to an SU in both active and standby states.

AMF assigns the CSIs to the components based on the capability of the component type of the components to support the CS type of the CSIs. So, basically within the same SU, if two components of two different types can handle the CS type of a CSI, it cannot be determined at configuration time to which component AMF will assign the CSI. In order to avoid having the CSIs of a particular CS type being assigned to a component of a component type that was not originally selected to support these CSIs, SUs can be created in such a way that, within the types of the component of the same SU, no two component types will overlap in the CS types they can provide. In other words the CSIs of the SI that share the same CS type will be handled by the SU components that share the same component type. This decision affects the component type selection since, now, the load of CSIs of the same CS type cannot be shared among the components of different types, which puts all the load of CSIs on the same type on one component type. Therefore, a significant criterion for the component type selection is its capacity of handling the CSIs load. The issue then becomes how to calculate this load.

The load of CSIs of a particular CS type that the components of the same SU will handle depends on two factors: (1) the number of SIs the SU will handle and (2) the number of CSIs of this CS type each of these SIs contain. Based on the assumption that, within the CSI-templates of an SI template, each CSI-template has a distinct CS type, the load of CSIs of a particular CS type the components of the same SU should handle can be calculated according to Equation 3.

Equation 3. The Load of CSIs a Component Type Must Handle.

ActiveLoadOfCSIs=ActiveLoadOfSIs×numberOfCSIs

StandbyLoadOfCSIs=StandbyLoadOfSIs×numberOfCSIs where:
numberOfCSIs refers to the number CSIs specified by the CSI-template for which we want to find the proper component type,
ActiveLoadOfSIs refers to the result of Equation 1, and
StandbyLoadOfSIs refers to the result of Equation 2.

To select an ETF component type, the CS type of the CSIs as specified in the CSI-template is matched to one of the CS types of the component type. The component capability model of the type should be verified to be compliant with the one required by the redundancy model specified in the SI-template the CSI-template belongs to. Depending on the required redundancy model and the component capability model, certain component types may be more suitable than others, while other component types may not be usable at all. For example, a component type that can have only active or only standby assignments at a time can be used in an SG of the 2N redundancy model, but it is not valid for an SG with N-way redundancy model where the components may have active and standby assignments simultaneously.

In addition, if the component type is checked as part of an SU type, the constraint imposed by the SU type on the component type needs to be verified. The maximum number of components in an SU of this SU type should not be exceeded. This limits the capacity of the SU for a component service type. Therefore, it should be ensured that the maximum number of components of the selected component type can provide the capacity necessary for the load of CSIs, as calculated in Equation 3, imposed by the load of SIs that are expected to be assigned to the parent SU.

Figure 4:
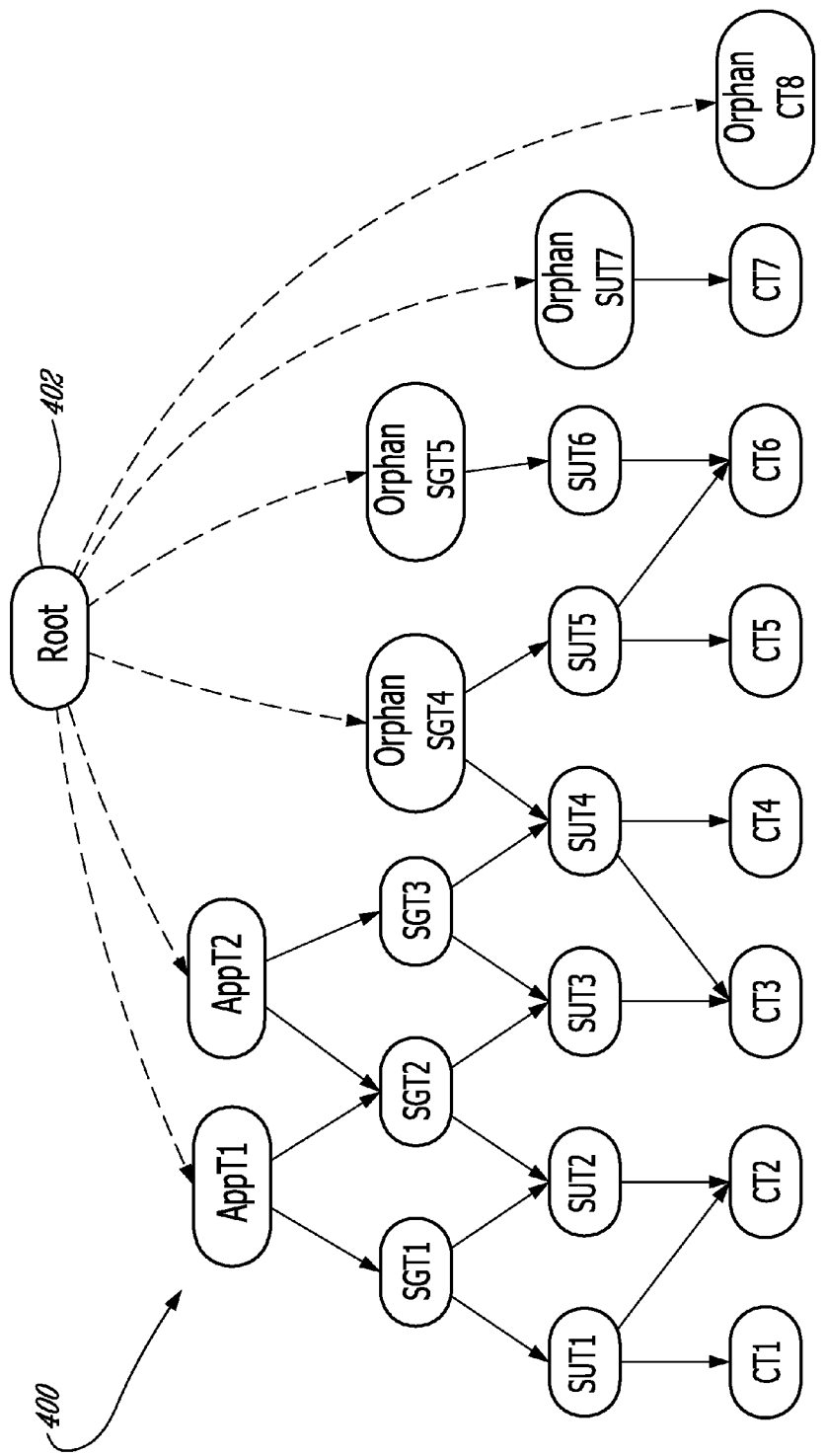
FIG. 4 depicts an Entity Types File (ETF) as a directed acyclic graph.

To determine the suitable SU, SG, and application types for a particular AMF configuration an algorithm can be used to perform a search from the highest defined level of types (i.e., the application type) as will now be described. ETF types can be structured in the form of a "disconnected non-ordered" directed acyclic graph (DAG) an example of which is provided in FIG. 4. The nodes of the DAG 400 represent ETF types, whereas the edges represent the relations among these types. Except for the application type, all other types can have more than one parent type; and since not all types are mandatory in ETF, some types might come with no parents. For example, SG types SGT4 and SGT5 of FIG. 4 do not have a parent application type. We refer to them as orphan types. A Root node 402 is added to connect the sub-graphs of the DAG 400 to facilitate type searching.

An algorithm for selecting ETF types is given below as Algorithm 1. The function SelectETFTypes takes the DAG as input (i.e., its root node) and an SI-template, and returns as output a set, called Types, which contains the ETF types—if there are any—to provide the services defined by the SI template and that satisfy the constraints that applies to these types, also referred to as requirements. Note that these requirements can change depending on the visited type. For instance, an orphan type may not have the same limitations as a non-orphan one. Moreover, the satisfaction of these requirements may depend on the parent type, e.g. the maximum number of components defined by the SU type and not by the component type. Therefore, it may be necessary to visit the same node several times.

| Algorithm 1 |
| --- |
| Types = { } |
| SelectETFTypes (Node N, SI-template SItemp) |
| 1.   For each child of N do |
| 2.     If child satisfies requirements then |
| 3.       If child is leaf then |
| 4.         Types = {child} |
| 5.         ST = {all provided CSTs of child} |
| 6.         If SItemp.ST $\subseteq$ ST then Return |
| 7.         For each sibling of child do |
| 8.           If sibling satisfies requirements then |
| 9.             Types = Types $\cup$ {sibling} |
| 10.            ST = ST $\cup$ {all provided CSTs of sibling} |
| 11.            If SItemp.ST $\subseteq$ ST then Return |
| 12.         Enddo |
| 13.         Types = { } |
| 14.         Return |
| 15.       Else |
| 16.         SelectETFTpes (child, SItemp) |
| 17.         If Types $\neq$ { } then |
| 18.           Types = Types $\cup$ {child} |
| 19.           Return |
| 20.   Enddo |

The initialization step in the above algorithm sets Types to an empty set. The SelectETFTypes function is a recursive function that performs a depth-first search traversal of the DAG starting from the Root node to the component types. More precisely, it starts by visiting the first child of the Root node, which in this case, consists of an application type if provided. The algorithm checks if this application type satisfies the configuration requirements. If this is the case, then the algorithm checks if it is a leaf node and, since it is not, the algorithm continues by recursively visiting the application type's SG types. Otherwise, the algorithm proceeds to the next child of the Root node which could be another application type, an orphan SG type, an orphan SU type or an orphan component type. If the algorithm finds an SG type with a redundancy model identical to the one specified in the SI-template, its SU types are visited.

An SU type is selected by the algorithm if it provides the service type specified in the SI-template and has the capacity, through the components of its component types, to handle the load of SIs (and their CSIs) expected to be assigned to an SU of this type as described above. To determine this, the component types of the SU type also need to be visited. When the first component type is reached and satisfies the requirements as described above, it also satisfies the leaf condition. This component type is added to the selected Types set, and to verify that service type of the SI template can be satisfied a new set is initialized with the CS types of this child and it is checked if the required service can be provided. If it cannot be provided yet, each sibling component type is checked and if satisfies the requirements, then the type itself and its provided CS types are added to the appropriate sets. After each sibling it is verified if the service type of the SI template can be provided. If so, the algorithm returns from the component type level. Alternatively, if the algorithm could not satisfy the service type after visiting all the siblings, then the collected types are cleared and the algorithm backtracks to the SU type level (or Root for orphan components) and selects a new SU type.

On the return path, depending on whether the Types set is empty or not, the algorithm can either continue the search with the next child, or add the current child to the Types set and return to the level above. When the algorithm terminates the Types set may be: (1) a complete type set, i.e. {AppType, SGType, SUType and CompTypes}, (2) a partial type set where some types are missing, e.g. {SUType and CompTypes}, or (3) empty. In the case where Types set is empty, the algorithm could not find any types to satisfy the configuration requirements. Therefore, no configuration can be generated to provide the requested services using the software described by the given ETF(s). In the case where the Types set is a complete set, all the necessary types have been identified by the algorithm. For the second case in between, the creation of some missing types is required. Algorithm 2 presented below can be used to create the missing types. This algorithm selects the orphan type(s) in Types and, as long as there is no application type in Types, it builds a new type from the last selected type(s) according to the SI-template.

---
Algorithm 2
---
CreateTypes (TypeSet Types, SI-template SItemp)
1. lastType = orphan types in Types
2. While AppType ∉ Types do
3.     Build newType from lastType for SItemp
4.     Types = Types ∪ {newType}
5.     lastType = newType
6. Enddo
---

Once ETF types are selected (or created), the corresponding AMF types are derived, and the corresponding AMF entities are generated. AMF types are created from the selected ETF types by deriving their attributes from the attributes provided in the ETF prototypes. In most cases this means using the default value provided for the type. In other cases, the AMF type is tailored to the intended use. For example, if an ETF component type can provide CST1 and CST2 CS types, but the type was selected to provide only one of them (e.g. CST1), in the AMF type only this component type is listed as provided CS type.

For created types, the AMF type attributes are derived based on the dependencies that can be established among the used ETF prototypes. For example, the default instantiation level of ETF component types of a created SU type is calculated based on the dependency of their provided CS types if any. Once all the AMF types have been supplied, their entities are created. For this again for each SI-template the number of components is determined within each SU of the selected SU type. This is based on the load of SIs expected to be assigned to the SU (Equations 1 and 2 above), the number of CSIs within these SIs, as well as the capability of the components, specified in the component type of these components. For example, if the SU can handle one SI, which contains four CSIs in a 2N redundancy model and that the component capability is 2 active and 3 standby then the number of components for this SU should be 4/2=2. In other words, the configuration only needs two components to be active for the four CSIs. The configuration also needs two components of this type in the standby SU to handle the four CSIs (using the ceiling of 3/2).

From the first created SU all the necessary SUs are duplicated to create the SG, which might also be duplicated to satisfy all the SIs of the template. The process is repeated for each SI-template. SGs are combined into applications based on the selected application types.

Thus far, the process described above has created the skeleton of the AMF configuration. That is, all the AMF types and the entities have been created; however it still remains to populate the remaining attributes of the AMF entities. The values of these attributes come from three sources: (1) ETF, for instance the types' attributes values are mostly derived from the values specified in ETF, (2) the configuration designer, for example the SI and CSI attribute values, and (3) the configuration generator, in the sense that some values must be computed. Among the computed values, some are calculated in a straightforward manner while others require deeper analysis. The SU ranking for SIs is one of the latter attributes. The SU ranking for SIs is a significant attribute that should be carefully set in order to ensure SI load balancing among the SUs of the same SG before and after failure. The embodiments below discuss this attribute in more detail and mechanisms for ensuring that the backup roles and active assignments are distributed among the SUs in a manner which achieves this objective.

Service Unit Ranking for Service Instances Amidst Load Balancing Concerns

As mentioned above, the workload assigned to the SUs is abstracted by SIs, and assigned to SUs by AMF at runtime. SUs collaborate to protect SIs within an SG, that is, when an SU fails, only an SU(s) of the same SG can take-over the load originally assigned to the failed SU. Two issues can arise in the context of the workload assignment depending upon the redundancy model which is being used, i.e., (1) the SIs must be evenly distributed among the SUs of the same SG and (2) when an SU fails, the workload assigned to this SU should be evenly redistributed among the other SUs of the SG in order to avoid a load misbalance.

In the 2N redundancy model, there is only one active SU per SG and one standby, therefore when the active one fails the entire load is shifted to the standby one, and therefore there is no load balancing issue to consider when ranking the SUs. The same applies to the "No Redundancy" redundancy model, since each SU is only allowed to be assigned one SI. However in the NWayActive redundancy model, several SUs can be assigned several SIs. The SI assignment is performed by AMF at runtime based on a ranked list of SUs for each SI, determined at configuration time.

Considering again the exemplary AMF configuration shown in FIG. 1, an NWayActive SG 104, consists of three SUs, and is protecting three SIs. Each SI has been configured to have two SUs that are assigned the active state on its behalf. Thus, if one SU serving a given SI fails, while the second active one keeps servicing the SI, AMF will also assign the remaining third SU the active HA state on behalf of this SI, since the SI is configured to have two active assignments. The runtime active assignment shown in FIG. 1 corresponds to a certain ranked list of SUs configured for each SI as shown in Table 2. While the actual active assignments are made at runtime of the system, the ranked list of SUs is generated when the system is initially configured.

TABLE 2

The ranked list of SUs for SIs.

|  | SU1 | SU2 | SU3 |
|---|---|---|---|
| SI1 | Rank = 1 | Rank = 2 | Rank = 3 |
| SI2 | Rank = 3 | Rank = 1 | Rank = 2 |
| SI3 | Rank = 3 | Rank = 2 | Rank = 1 |

The ranking shown in Table 2 operates according to the following rules:
(1) Each SI has a ranked list of all the SUs in the SG. Thus, in Table 2, each of SI1, SI2 and SI3 has a rank for each of the three SUs.
(2) The number of SUs that will be assigned to the active/standby state is defined by the preferred number of active/standby assignments configured for the SI. The SUs with the highest ranks (lowest integer values) in the ranking table will be assigned to the active/standby state on behalf of the SI at runtime.
(3) In case of an SU failure, the SU with the next highest rank will get an active assignment. For example, according to Table 2, if SU1 fails then SU3 will get the active assignment on behalf of SI1. Note that while Table 2 illustrates one possible ranking; other rankings are possible and other equivalent rankings could lead to the assignment shown by the arrows between the SIs and SUs in FIG. 1.

The problem of load balancing such an AMF system using an NWayActive redundancy model, both before and after a failure of an SU, using a conventional round robin algorithm will now be discussed. To provide a concrete example, consider a scenario with 14 SIs protected with an SG of 6 SUs and an NWayActive redundancy model. The numberOfActiveAssignments for each SI is set to 3, i.e. each SI is configured to have three active SUs.

FIG. 5 shows a ranked list 500 of the six SUs in this example which was generated using a round robin algorithm. According to this ranking, at runtime, AMF will assign the HA active state for each SI in the following manner:
SU1, SU2 and SU3 will be assigned the HA active state for SI1, SI3, SI5, SI7, SI9, SI11, SI13, and
SU4, SU5 and SU6 will be assigned the HA active state for SI2, SI4, SI6, SI8, SI10, SI12, SI14.

The cells which are shaded in FIG. 5 correspond to the active assignments. Following this ranking, the active load will be evenly distributed among the SUs, i.e., at runtime with all of the SUs up and running Each SU will have 7 active assignments. Thus, in the absence of an SU failure, a round robin algorithm solves the problem of ranking with load balancing. However given that AMF is intended to support high availability systems, failure consideration is important.

Figure 6:
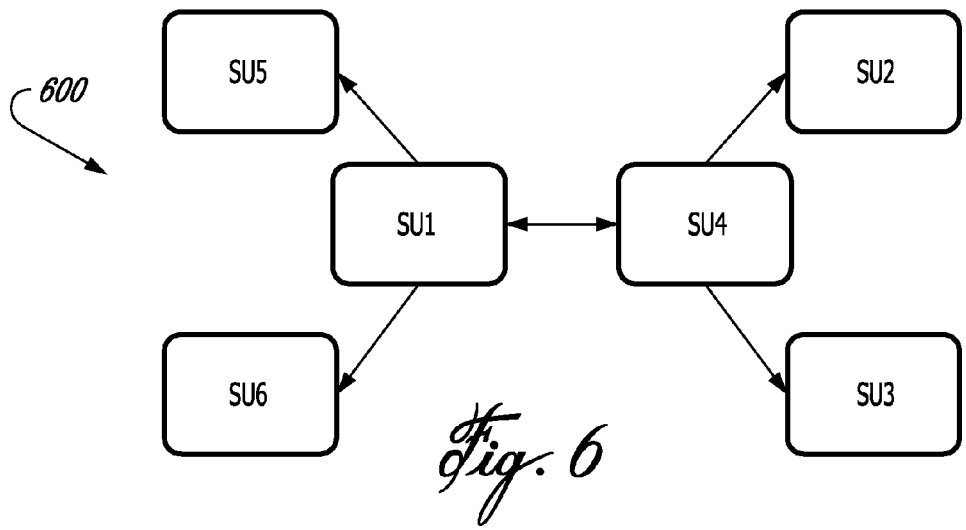
FIG. 6 shows a repetitive pattern associated with backup roles which occurs when using the ranked list of service units of FIG. 5.

Thus assume that SU1 (or SU2 or SU3) fails, then the active assignment of each SI assigned to SU1 will be shifted to the SU with the next higher rank and which is not already active for the SI. Therefore, according to the ranking in FIG. 5, all the workload of SU1 would be shifted to SU4 causing it to bear twice the load of any other SU. In this case SU4 is seen as a "backup" for SU1 with respect to all its assignments. The shortcoming of using the round robin algorithm to allocate active loads to the SUs is that it eventually develops a repetitive pattern 600 as shown in FIG. 6. After SI2, the pattern keeps repeating itself every two SIs. When using round robin as the active load allocation algorithm in this example, SU1 and SU4 are the only SUs that are backing up the other SUs in case of failure as illustrated in FIG. 6, which is derived from FIG. 5. SU1 is backing up SU4, SU5 and SU6, while SU4 is backing up SU1, SU2 and SU3.

To address this issue with a different algorithm according to embodiments, it is first helpful to more precisely define the problem. Given a predefined set of SIs that will be assigned to a set of SUs, the portion of SIs that each SU is supposed to serve can be easily computed, and a corresponding ranking can be produced. However, one main concern, as discussed above with respect to the round robin example, is what happens after an SU failure, i.e., how will the load assigned to the failed SU be distributed among the remaining SUs in a balanced way. The SUs should be assigned an equal initial load and, in case of failure, the load of the failed SU should be evenly assigned among the remaining SUs to maintain a balanced load and avoid cascading failures cause by overload. These attributes of balancing both an initial, active load and also the backup roles should be captured at configuration time, e.g., in a ranked SU list.

As shown earlier, the problem of the round robin algorithm is in the re-assignment of the SIs to the remaining SUs. Only one SU, e.g. SU4 in the previous example, will be re-assigned to all of the SIs initially assigned to SU1 when the latter fails. Therefore, the solution to this problem of load balancing after single failure should be tackled from the perspective of SUs backing up each other for SIs and make sure that SIs assigned to a particular SU are equally backed up by the remaining SUs.

Each SU can have at most one active assignment with respect to a particular SI. So, if an SU has X active assignments, then it is assigned X different SIs. It would be preferable to ensure that these X SIs are backed up evenly by the other SUs. In order to achieve this, embodiments described herein start by assigning each SU an equal number of SIs to backup, then determine the SUs that will be active for those SIs, and finally generate an output that implements this even distribution of active loads and balanced roles, e.g., as a ranked list of SUs for each SI.

An embodiment is described herein for application to AMF configurations which utilize the NWayActive redundancy model, however concepts discussed herein can apply to other redundancy models. The embodiments discussed below rely upon the following assumptions:
The SUs have the capacity to support the SIs that AMF assigns to them even after an SU fails and its load is shifted to the other SUs.
The SIs of the same SG have the same protection level, and therefore the numberOfActiveAssignments is the same for all of them.
The SIs impose the same load on the SUs.
There are at least two SUs in the SG, and they are all in service, that is, we have no spare SUs.
The numberOfActiveAssignments is less than the number of SUs.

Figure 7:
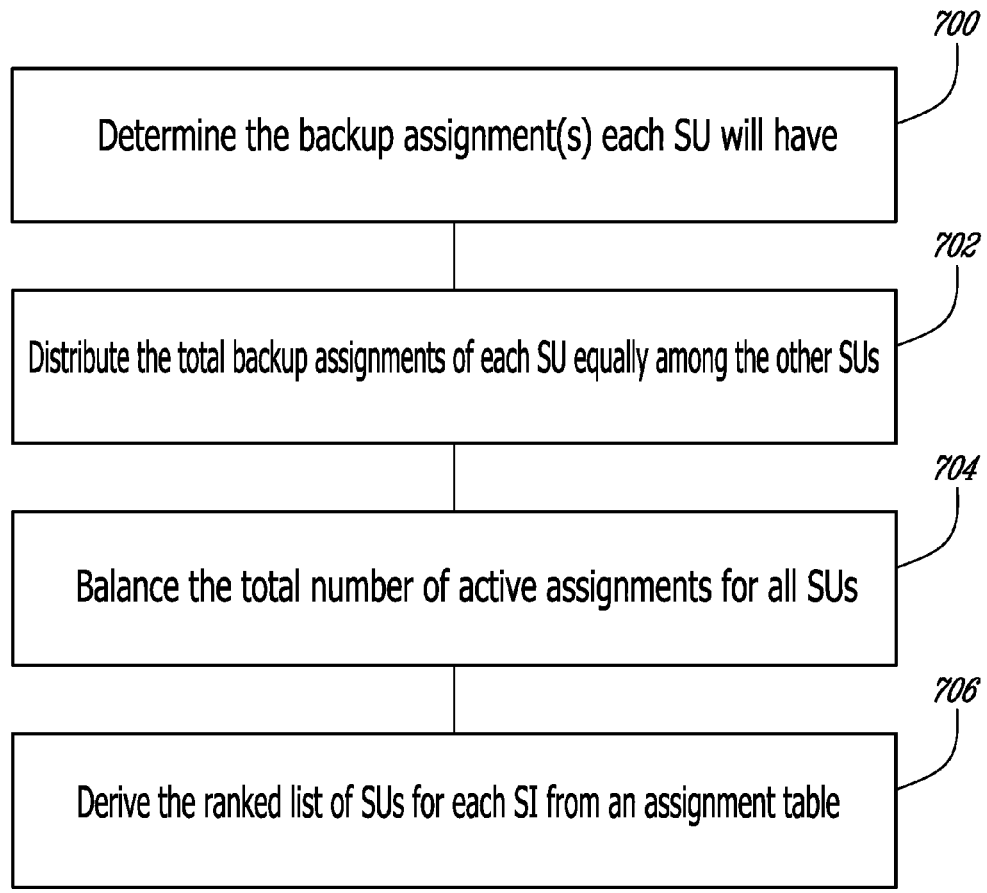
FIG. 7 is a flowchart illustrating a method for balancing backup roles and active assignments according to an embodiment.

According to one exemplary embodiment, a method for balancing backup assignments and active workload assignments can include the steps illustrated in the flow chart of FIG. 7. Therein, at step 700, a total number of backup assignments each SU will have is determined. The total backup assignments of each SU are distributed equally among the other SUs at step 702. The total number of active assignments for all SUs is balanced at step 704, and a ranked list of SUs for each SI from the assignment table at step 706.

Referring first to step 700, for the NWayActive redundancy model one or many SUs will be assigned the active HA state on behalf of an SI. However, only one SU will serve as a backup for this SI if any of its active SUs fails. Stated differently, the backup SU is backing up (or has the backup role for) the active SUs in terms of this SI. If this particular SI requires x active SUs where x is the numberOfActiveAssignments, then the backup SU is backing up x active assignments. It is important here to distinguish that although the backup assignment is in terms of SIs, the numberOfActiveAssignments each SI has is brought into the equation (Equation 4 below) used to determine the backup assignment each SU will have, because if one SU is backing up an SI this means it is backing up all of its active assignments, while on the other hand being active for an SI means having a maximum of one of its active assignments.

A prerequisite, according to an embodiment, for ensuring back up balancing is that each SU back up an equal number of SIs. The backup value of an SU is given by Equation 4.

Backup assignment for each $SU$ $$\text{Backup} = \begin{cases} \left\lfloor \dfrac{numberOfSIs}{numberOfSUs} \right\rfloor \times numberOfActiveAssignments \\ \text{or} \\ \left\lceil \dfrac{numberOfSIs}{numberOfSUs} \right\rceil \times numberOfActiveAssignments \end{cases} \quad \text{Equation 4}$$

Since the number of SUs is not always a divisor of the numberOfSIs, some SUs will get the floor of this division while others will get the ceiling with the constraint that the sum of the backup assignments for all SUs is equal to numberOfSIs*numberOfActiveAssignments. Of course, an SU does not back up its own active assignments, but the active assignments of the other SUs as shown below it in Table 3.

In order to ensure backup balancing, it is not enough that the SUs backup the same number of active assignments, because if all those active assignments are provided by one SU, and this SU fails, its entire load will go to the backup SU that is already active for its own SIs. This will result in the same pitfall as that of using the round robin algorithm for balancing as described above. Therefore, the number of active assignments backed up by an SU according to an embodiment is the sum of equal contributions±1 from all the other SUs. In other words, if the SU is calculated to have x back up assignments, and there are n SUs, then a balancing algorithm should ensure that the SU will back up each of the other SUs in x÷(n−1) active assignments. This division may result in a decimal value; some SUs may get an extra back up from the SU in question. However, a backup distribution using this policy will result in substantially equal balancing among the SUs. In order to render the solution more concrete, it can be visualized in terms of an assignment table an example of which is shown in Table 3, which Table shows simultaneously the active and backup assignments.

TABLE 3

Distributing Assignments of SUs

| | $SU_1$ | ... | $SU_j$ | ... | $SU_n$ | Backing Up |
|---|---|---|---|---|---|---|
| $SU_1$ | N/A | | | | | |
| ... | | N/A | | | | |
| $SU_i$ | | | N/A | | | |
| ... | | | | N/A | | |
| $SU_n$ | | | | | N/A | |
| Act | | | | | | — |

Table 3 represents the blueprint of an assignment table which can be used to, for example, distribute the backup assignments and the active assignments among the SUs. A value x in cell SUij represents a number of assignments. However this value can either mean the number of active assignments, or the number of backup assignments. The SU rows represent the number of backup assignments each SU will have for the other SUs. The cells denoted with N/A (not applicable) means an SU cannot back up itself. A value x in cell SUij means that the SUi will back up SUj in x of SUj's active assignments. The "Backing Up" column is used to hold the value of the total backup assignments that was calculated with Equation 4 for each SU. The SU's cell values of any row i is assigned in such a way that (1) their sum is equal to the "Backing up" cell value in row i (2) the cell values can only be the floor or the ceiling of the baking up value after it is divided by (the number of SUs−1). In other words, if SUi is backing up x active assignments, those assignments should be equally distributed among other SUs. The "Act" row at the bottom of Table 3 is used to hold the values of the total active assignments each SU is expected to have. This is the sum of the column cells values. Note that the SUs of the columns and the rows of the table are identical, although different indexing is used (i for row and j for column) to avoid ambiguity. An illustrative example of using this type of assignment table to balance backup roles or assignments of SUs is provided below with respect to FIG. 8.

So far the backup assignments have been determined and balanced per steps 700 and 702 of FIG. 7. However, the total active assignments that each SU is handling from previous calculations may be uneven, i.e., the values of the 'Act' row may be imbalanced. In order to solve this issue another balancing should be performed to make sure that the SUs have equal active assignments, per step 704 of FIG. 7. If there are a number of SIs each having a numberOfActiveAssignments to be assigned to the same number of SUs, the load will be evenly balanced among the SUs if each SU is assigned one of the values defined in Equation 5.

Active assignment for each $SU$.

$$\text{Active} = \begin{cases} \left\lfloor \dfrac{numberOfSIs \times numberOfActiveAssignments}{numberOfSUs} \right\rfloor \\ \text{or} \\ \left\lceil \dfrac{numberOfSIs \times numberOfActiveAssignments}{numberOfSUs} \right\rceil \end{cases} \quad \text{Equation 5}$$

Again since the number of SUs is not always a divisor of the value of the numberOfSIs*numberOfActive Assignments, as shown in Equation 5 some SUs will get the floor of this division while others will get the ceiling with the constraints that the sum of the active assignments for all SUs is equal to numberOfSIs*numberOfActiveAssignments. Some SUs may have an extra load of one active assignment compared to other SUs. The sum of the cells in the "Act" row and the sum of the cells in the "Backing up" column are both equal to numberOfSIs*numberOfActiveAssignments. This is due to the fact that this number represents the total active assignments an SG will protect, regardless how the system assigns the active and backup assignments; this number is always going to be the same. Note that in Equation 1 the minimum load of SIs any SU must be able to handle was calculated and, therefore, used only the ceiling function. By way of contrast, in Equation 5 the exact load is being determined and, therefore, both ceiling and floor functions are used.

Thus, step 706 in the flowchart of FIG. 7 can be performed by making sure that the total active assignments for each SU is one of the values in Equation 5. In addition, this is preferably performed without affecting any value in the "Backing Up" column, i.e., without unbalancing the backup roles. In other words the during this portion of the AMF configuration process, it is desirable to shuffle the values in the row cells of the assignment table in such a way that (1) their sum remains intact and equal to the value of the "Backing Up" cell in the row, and (2) achieve a balance so that the cells of the "Act" row have values as given by Equation 5. This reasoning converts this problem into a constraint satisfaction problem (CSP), where there are a set of values within a table, and they are constrained by the fact that the sum of the row cell values and the sum of the column cell values must conform to certain values.

Algorithm 3 below can be used by the system or AMF configuration generator to solve the constraints satisfaction problem of balancing the active load.

| Algorithm 3 |
|---|
| 1. balance( ) |
| 2.   if (each column has a sum equal to |
| 3.     Active) |
| 4.   then |
| 6.     return true |
| 7.   else |
| 8.     return false |
| 9.end balance( ) |
| 10.solveCSP( ) |
| 11.   While (not balanced( ))do |
| 12.     minColumn ← the column with |
| 13.     minimum sum of cells |
| 14.     maxColumn ← column with the |
| 15.     maximum sum of cells |
| 16.     while (sum(maxColumn) – |
| 17.       sum(minColumn) > 1) |
| 18.       swap the minimum value in |
| 19.       minColumn with the maximum |
| 20.       value in maxColunm |
| 21.     end while |
| 22.   end while |
| 23.end solveCSP |

Algorithm 3 includes two main functions, the balance( ) function that test whether the SUs have equal active assignments, and the solveCSP( ) function that keeps swapping row values until the balance is obtained. Note that Algorithm 3 could have started working with the columns of Table 3, and therefore balance the active load first and then work with the backup assignment, or work simultaneously with both as it is the case for such constraints solving problems.

Once the backup roles and active assignments are balanced, step 706 of FIG. 7 can be performed to automatically generate the ranked list of SUs for each SI. The rank values of this list are based on the balanced assignment table. The list can be generated in the following manner. For each row in the table that corresponds to SUi, the configuration generator 206 will calculate the number of different SIs that this SU is backing up by dividing the value in the "Backing Up" cell of the row over the numberOfActiveAssignments. The assignment table indicates how many active assignments each of the other SUs will have on behalf of the SIs backed up by SUi, but the configuration generator 206 still needs to determine to which particular SU each SI will be assigned. This too can be considered another CSP problem, with the following constraints:

The number of SUs assigned active to each SI must be equal to the numberOfActiveAssignments, and The number of SIs each SU (excluding SUi) will be active for is specified by the assignment table and must be respected.

By solving this latter CSP problem, the active SUs are determined and assigned the lower ranks, the SU that was assigned the N/A value (i.e. SUi) will serve as the backup, and therefore will have the first rank higher than the SUs with the active assignments, the other SUs will have ranks greater than the one assigned to the backup SU. The above process will result in a sub-list of ranked SUs generated for the SIs backed up by SUi. The same process is repeated for all the rows, and the sub-lists of ranked SUs are joined together repeatedly until the ranked list of SUs for all SIs is obtained.

To illustrate the foregoing discussion of the steps of FIG. 7, a numerical example will now be discussed. It will be appreciated that, however, this numerical example is purely illustrative and not intended to limit these embodiments. For comparison purposes, the exemplary configuration used above with respect to application of the round robin algorithm consider, i.e., a scenario with 14 SIs protected with an SG of 6 SUs and an NWayActive redundancy model. Again, the numberOfActiveAssignments for each SI is set to 3, i.e. each SI is configured to have three active SUs.

Now, applying the steps of FIG. 7 to this AMF configuration problem, step 700 calculates the backup assignment for each SU. According to Equation 4, the backup in terms of SIs is equal to the floor or ceiling of (14÷6)=2.33. Thus, for this example, some SUs will back up two SIs while others will back up three. Thus, the configuration generator 206 would multiply those numbers, i.e., two and three, with the numberOfActiveAssignments to get the "backing up value" each SU will handle in terms of active assignment, i.e., six and nine.

Figure 8:
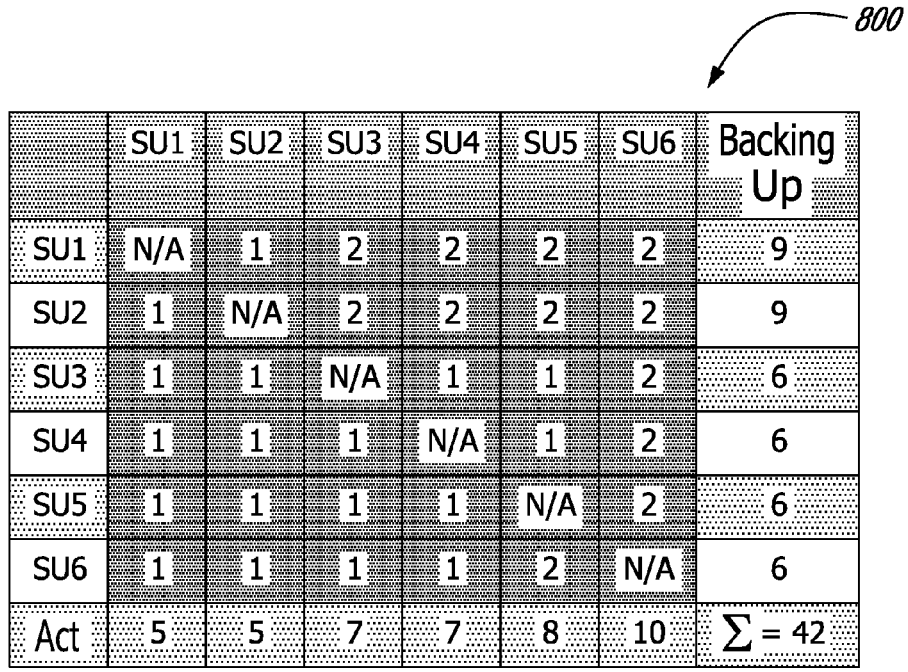
FIG. 8 is an assignment table according to an embodiment, wherein backup roles of service units have been distributed, but active assignments remain unbalanced.

Knowing the backup assignments, the process can proceed into the second step (702) and populate an assignment table 800 with values as shown in FIG. 8. The values in the cells are assigned by taking the value in the Backing up cell of each row and dividing it evenly among the other cells of the same row. Note that at this step of the table is still not completely balanced, only the backup values are balanced among the SUs. Thus the numbers in the "Act" row at the bottom of the table in FIG. 8 can be seen to vary significantly.

The third step (704) then consists of balancing the active load among SUs. As mentioned above, the problem here is a constraint satisfaction problem that involves shuffling the values in the table cells in such a way that the sum of the columns would be floor or ceiling of the value calculated according to Equation 5, in this example yielding Active= (14×3)÷6=7. Solving the CSP by, e.g., using Algorithm 3 to swap the values in the rows/cells in the table of FIG. 8 such that each SU column adds to 7 will result in the balanced table 900 shown in FIG. 9.

Figure 9:
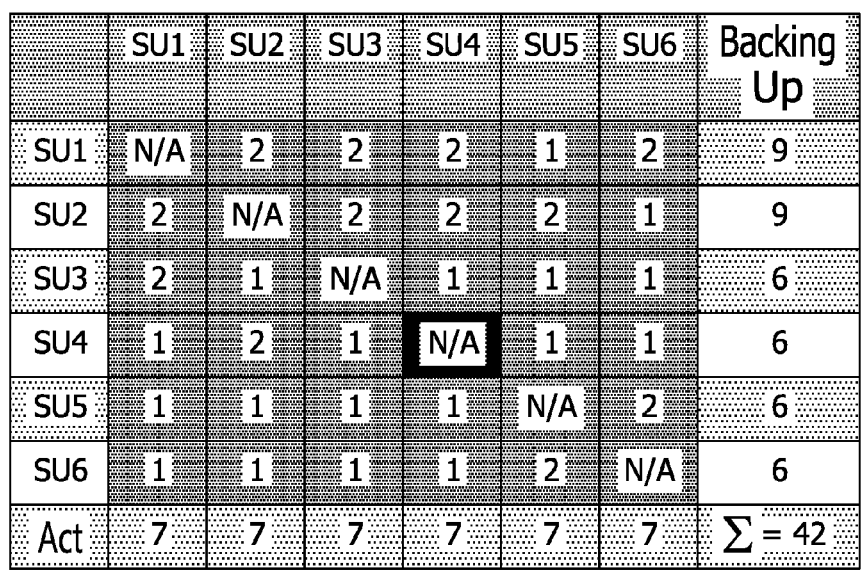
FIG. 9 is an assignment table according to an embodiment, wherein the backup roles of service units have been distributed and the active assignments have been balanced.
Figure 10:
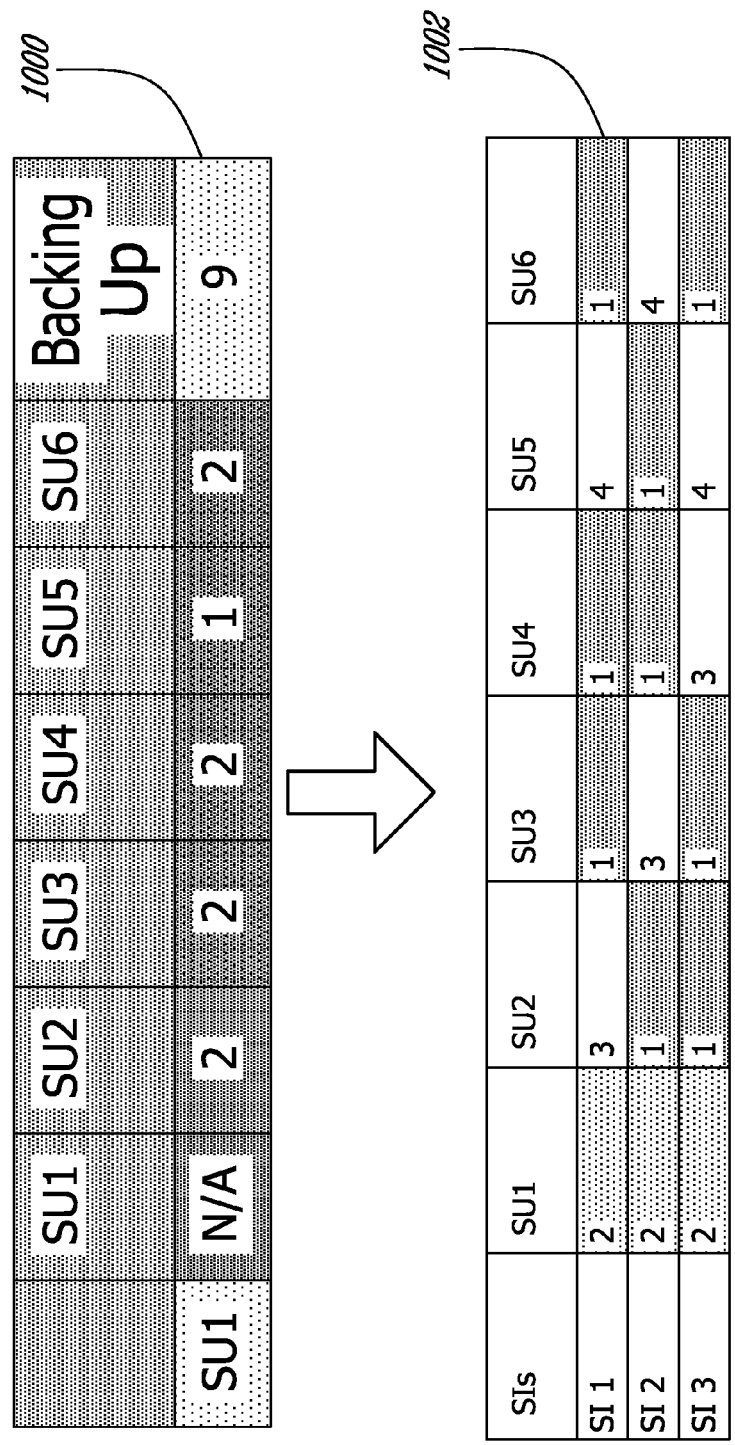
FIG. 10 illustrates how a first row of the assignment table of FIG. 9 can be transformed into a subset of a ranked list of service units according to an embodiment.

The last step according to the embodiment of FIG. 7, step 706, is to derive from the table of FIG. 9 a ranked list of SUs for each SI. Each row of the assignment table holds the information needed to generate the ranked list of SUs for a subset of SIs. This can be evaluated a row at a time, extracting the information encapsulated in that row and, based on this information, generating the ranked list of SUs. FIG. 10 shows an example of the top row 1000 of assignment table 900's evaluation wherein the ranked list 1002 of SUs is generated for the subset of SIs backed up by SU1.

The process which is performed on this top row according to an embodiment is as follows. Based on the first row 1000 of the table in FIG. 9, it can be deduced that SU1 will back up three SIs (i.e., 9/3 where 3 is the numberOfActiveAssignments). So for SI1, SI2 and SI3 the backup is SU1, therefore SU1 is not allowed to be active for those SIs and as a result will be assigned a rank higher than the one we will assign to the active SUs of behalf of those three SIs. In order to determine which SU is active on behalf of which SI, the CSP problem is solved by assigning 9 active assignments to 5 SUs on behalf of 3 SIs in such a way that each SU will have the exact value of active assignments specified in the assignments table, e.g. the table specifies that SU5 has only one active assignment and therefore will be active for at most one of the SIs backed up by SU1. The ranked list 1002 presents one possible solution to this problem. The SU with the active assignment is given the lowest rank. The rest of the SUs will be given a rank higher than the one assigned to the backup SU (i.e. SU1). This process is repeated for all the rows, until we have a complete list of ranked SUs for all SIs.

Figure 11:
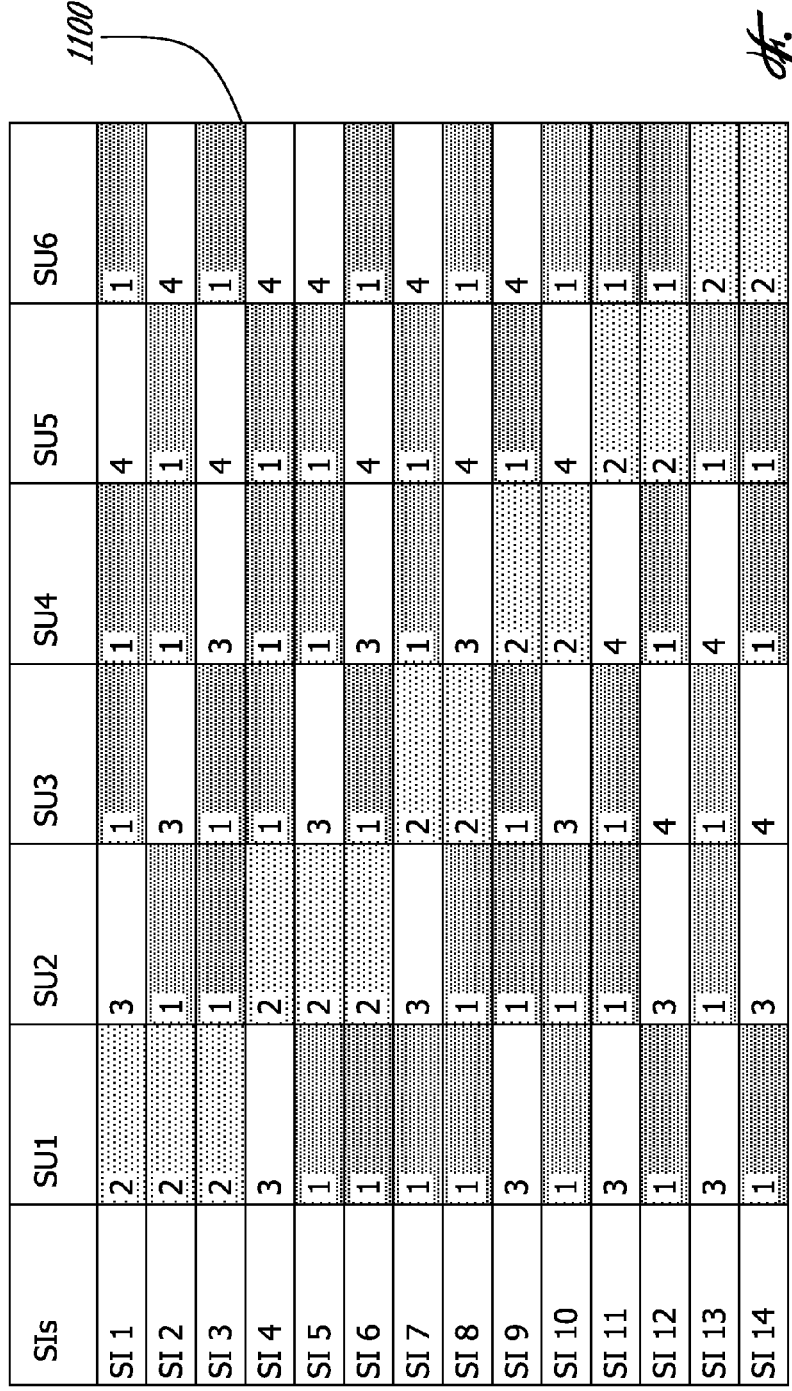
FIG. 11 shows a complete ranked list of service units according to an embodiment.

A complete, generated ranked list 1100 of SUs for this exemplary configuration is provided as FIG. 11. Therein, the cells holding the backup assignment have the number "2", while the cells holding the active assignment have the number "1" therein. This solution represents a balanced configuration wherein the load is substantially balanced while all of the SUs 1-6 are operative and will also be substantially balanced after any one of the SUs 1-6 fails.

Figure 12:
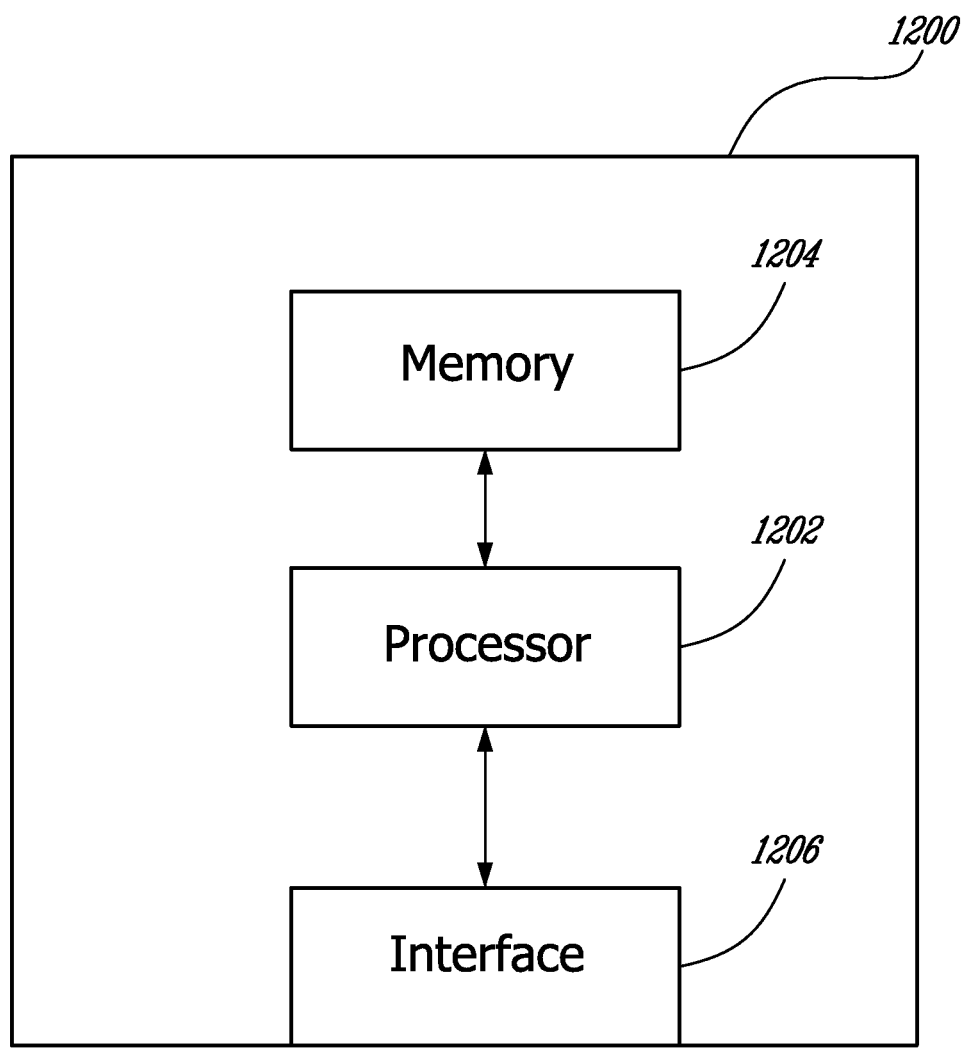
FIG. 12 depicts a node which can operate as an AMF configuration generator according to an embodiment.

The techniques described above can be performed by an AMF configuration generator 206 at configuration time, e.g., when an AMF specified system is configured for service. The AMF (or other) configuration generator can implement some, or all, of the afore-described algorithms and techniques to balance the backup roles and active assignments of SUs. The configuration generator may be implemented as software running on a computer or server 1200 as shown in FIG. 12. Therein, processor 1202 can execute software code which includes the afore-described techniques and algorithms, that can be stored in memory 1204. The inputs described above, e.g., from software vendors, etc., can be provided to the processor 1202 via interface 1206.

Figure 13:
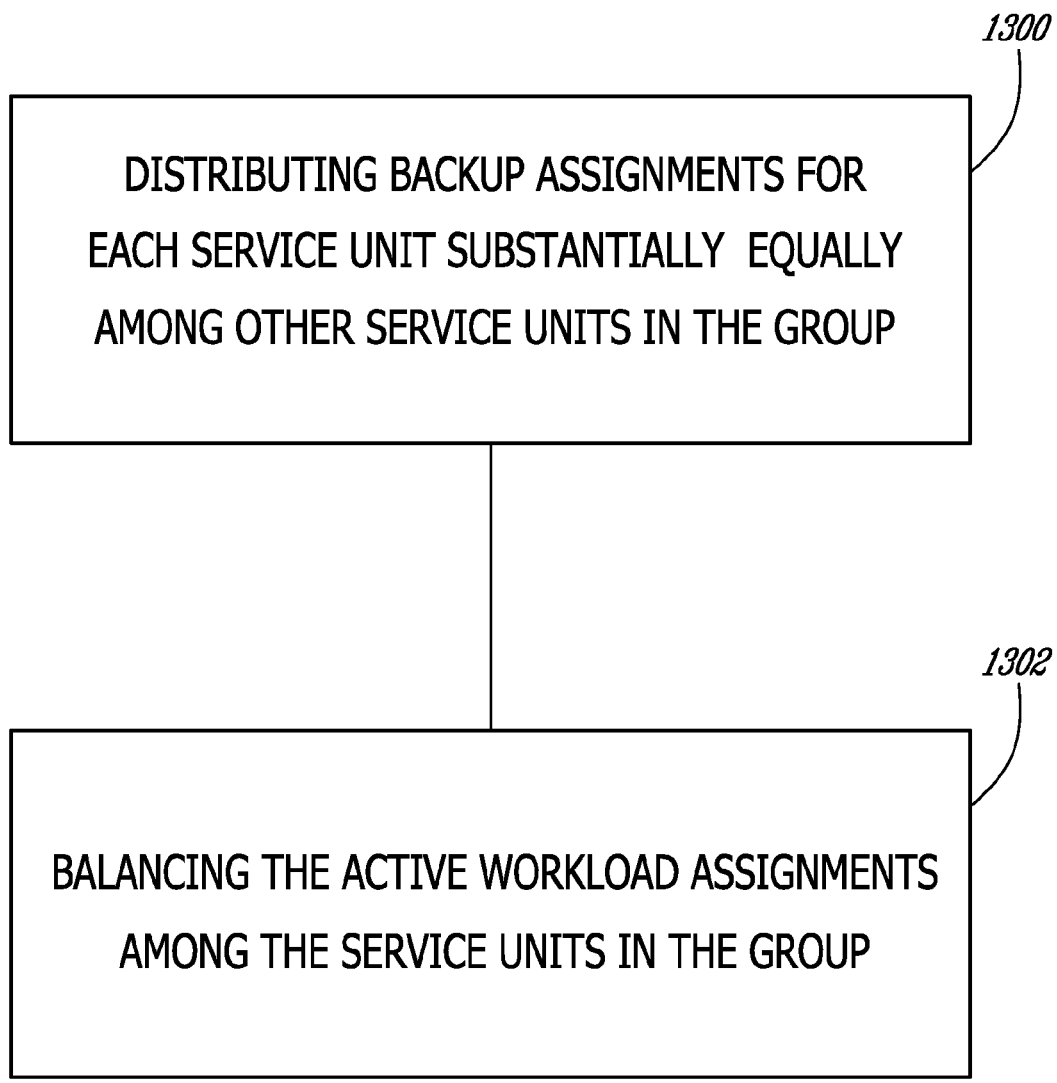
FIG. 13 is a flowchart illustrating a method for balancing backup roles and active assignments according to another embodiment.

While the steps illustrated in FIG. 7 depict one method for balancing backup and active assignments according to an embodiment, other embodiments can operate more generally. For example, as shown in the flow chart of FIG. 13, another method for balancing backup and active assignments includes distributing the backup assignments for each service unit substantially equally among other service units in the group, at step 1300, and then balancing the active workload assignments among the service units in the group at step 1302. The output of the balancing step 1302, which is not part of the method of FIG. 13, may, for example, be a ranked list of SUs or may take some other form which can be used by an AMF (or other) system at runtime to make balanced assignments of both active loads and backup roles.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A method for balancing backup assignments and active workload assignments for a group of service units in a system according to a redundancy model of an Availability Management Framework (AMF), the method comprising:
   distributing the backup assignments for each service unit substantially equally among other service units in said group, wherein the backup assignments indicate, if a given service unit fails, how many Service Instances (SIs) initially assigned to the given service unit are to be re-assigned to each of other service units in said group, wherein the total number of said backup assignments is calculated in part by using a ratio of a number of said Service Instances over a number of said service units; and
   balancing the active workload assignments among said service units in said group.

2. The method of claim 1, wherein a workload in said system is substantially balanced between said service units both while all of said service units are operational and after a failure of one of said service units.

3. The method of claim 1, wherein each of said backup assignments indicate which service unit will support a service instance that is initially assigned to another service unit as one of said active workload assignments, if said another service unit fails.

4. The method of claim 1, further comprising: deriving a ranked list of service units for each SI in said active workload assignments.

5. The method of claim 1, wherein the service units are for protecting the SIs in an AMF configuration according to an NWayActive Service Group (SG) redundancy model.

6. The method of claim 1, further comprising: determining a total number of said backup assignments by calculating said total backup assignments being equal to one of a floor or a ceiling of ((a number of service instances (SIs)/number of service units (SUs)) times a number of active workload assignments).

7. The method of claim 1, wherein the number of active workload assignments backed up by a service unit equals a contribution of other service units plus or minus one, and wherein the step of distributing the backup assignments further comprises: calculating, for each service unit, total backup assignments distributed to other service units being equal to either a floor or a ceiling of x/(n−1), wherein x is the number of backup assignments of the service unit and n is the total number of service units.

8. The method of claim 1, further comprising: filling an assignment table with assignments which associates backup assignments to active workload assignments among the service units.

9. The method of claim 8, wherein the assignment table further comprises:
   one row and one column for each SU; an additional row summarizing a total number of said active workload assignments values computed with:

$\text{Act}j = \text{SUM}(i=1:n)(\text{SU}ij)$ an additional column containing a value of the total backup assignments for each SU computed with:

$\text{Backup}i = \text{SUM}(j=1:n)(\text{SU}ij)$ where j is an index for the columns and i is an index for the rows.

10. The method of claim 9, wherein at each iteration, numbers shuffle in the assignment table, but the sum Backup$i$ remains the same until the cell of the Act row has a value +/−1 of an average computed with:

Average=(number of service instances(SIs)×number of active assignments/number of service units (SUs)), whereupon said balancing of said active assignments is complete.

11. A configuration generator that balances backup assignments and active workload assignments for a group of service units in a system according to a redundancy model of an Availability Management Framework (AMF), comprising:

a processor configured to distribute the backup assignments for each service unit in said group substantially equally among other service units in said group, to balance the active workload assignments among said service units in the group, and to generate a configuration which takes into account said distributed backup assignments and said balanced active assignments, wherein the backup assignments indicate, if a given service unit fails, how many Service Instances (SIs) initially assigned to the given service unit are to be re-assigned to each of other service units in said group, and wherein said processor is further configured to calculate the total number of said backup assignments in part by using a ratio of a number of said Service Instances over a number of said service units.

12. The configuration generator of claim 11, wherein a workload in said system is substantially balanced between said service units both while all of said service units are operational and after a failure of one of said service units.

13. The configuration generator of claim 11, wherein each of said backup assignments indicate which service unit will support a service instance that is initially assigned to another service unit as one of said active workload assignments, if said another service unit fails.

14. The configuration generator of claim 11, wherein said processor is further configured to generate a ranked list of service units for each SI in said active workload assignments.

15. The configuration generator of claim 11, wherein the service units are for protecting the SIs in an AMF configuration which uses an NWayActive Service Group (SG) redundancy model.

16. The configuration generator of claim 11, wherein said processor is further configured to determine a total number of said backup assignments by calculating said total backup assignments being equal to one of a floor or a ceiling of ((a number of service instances (SIs)/number of service units (SUs)) times a number of active workload assignments).

17. The configuration generator of claim 11, wherein the number of active workload assignments backed up by a service unit equals a contribution of other service units plus or minus one, and wherein the processor is configured to distribute the backup assignments by: calculating, for each service unit, total backup assignments distributed to other service units being equal to either a floor or a ceiling of x/(n−1), wherein x is the number of backup assignments of the service unit and n is the total number of service units.

18. The configuration generator of claim 11, wherein said processor is further configured to fill an assignment table with assignments which associates backup assignments to active workload assignments among the service units.

19. The configuration generator of claim 18, wherein the assignment table further comprises: one row and one column for each SU;

an additional row summarizing a total number of said active assignments values computed with:

Act$j$=SUM($i$=1:$n$)(SU$ij$)

an additional column containing a value of the total backup assignments for each SU computed with:

Backup$i$=SUM($j$=1:$n$)(SU$ij$);

where j is an index for the columns and i is an index for the rows.

20. The AMF configuration generator of claim 19, wherein at each iteration, the processor shuffles numbers in the assignment table, but the sum Backup$i$ remains the same until the cell of the Act row has a value +/−1 of an average computed with:

Average=(number of service instances(SIs)×number of active assignments/number of service units (SUs)), whereupon said balancing of said active workload assignments is complete.

* * * * *

UNITED STATES PATENT AND TRADEMARK OFFICE
CERTIFICATE OF CORRECTION

PATENT NO. : 8,695,012 B2
APPLICATION NO. : 13/020550
DATED : April 8, 2014
INVENTOR(S) : Kanso et al.

It is certified that error appears in the above-identified patent and that said Letters Patent is hereby corrected as shown below:

In the Specification

Column 8, in Equation (1), Line 5, delete "if redMod= "N Way"" and insert
-- if redMod= "N + M" --, therefor.

Column 13, Line 63, delete "running" and insert -- running. --, therefor.

Signed and Sealed this
Second Day of September, 2014

Michelle K. Lee
*Deputy Director of the United States Patent and Trademark Office*